United States Patent Office 3,016,331
Patented Jan. 9, 1962

3,016,331
PURIFICATION OF HEPARIN
Nazzareno Toccaceli, Milan, Italy, assignor to Ormonoterapia Richter S.p.A., Milan, Italy, a firm
No Drawing. Filed May 9, 1960, Ser. No. 27,536
Claims priority, application Italy Jan. 28, 1960
8 Claims. (Cl. 167—74)

This invention relates to the preparation of a raw heparin product from various animal tissues. It is already known that heparin forms insoluble compounds with proteins when the pH of the medium is lowered to 2.5–2.0. On this property is based our method of quantitative precipitation from purified extracts of animal tissues, i.e. lung, liver and small intestine.

The digestion of the tissues by means of proteolytic enzymes increases greatly the yield of heparin; in order to use the minimum possible amount of these enzymes, it is advantageous that the enzymatic digestion be preceeded by an autolysis.

The enzymes that can be used conveniently for this digestion are: papain, trypsin, pepsin, pancreatin and also fresh extracts of pancreas. Generally it is preferable to use trypsin, pancreatin or fresh pancreas extracts. In this case the digestion must be carried out at a temperature of 37–40° C. and the pH must be kept between 7.8 and 8.5.

After the autolysis and the following digestion a turbid liquid is obtained, which is filtered hot (90–95°), at a pH of 8.0–8.2, through filtering earth but the filtered liquid is not clear. Lowering the pH at this point from 8.0 to 2.0 with concentrated hydrochloric or sulfuric acid, produces a voluminous precipitate which is difficult to separate and which contains 70 to 90% of the whole heparinic activity; the activity of the raw product, dried with acetone, is found to be about 1–2 u./mg. and its purification is difficult.

Now we have found that these defects can be eliminated, operating as follows: the digested liquid, which has been filtered once, is brought to pH 7.5 with hydrochloric or sulfuric acid at a temperature of about 20° C.; filtering earth is added and the liquid is heated to 70–80° C. The liquid is cooled to room temperature and is filtered again at this temperature. In this way a large amount of inactive material is eliminated, obtaining a colored but clear liquid.

It is possible to eliminate the first filtration, bringing the value of the pH from 8.0–8.2 to 7.5 right after the digestion.

A precipitation at a pH of 2.5–2.0, at this moment, would result in only a partial recovery of the heparinic activity (35 to 50% of total); by diluting the liquid with two volumes of water, a further precipitation of heparin takes place, but the total recovery does not exceed 80%.

In order to obtain a quantitative recovery of the heparinic activity in the precipitate at pH 2, we have found that it is sufficient to add to the liquid, at pH 7.5, small amounts of proteins (e.g.: casein, lactalbumin, seralbumin, ovalbumin, histones, and so on); a precipitate is obtained in this way, which settles quickly and which contains the whole heparinic activity of the original liquid. This precipitate can be separated by centrifuging or by filtering, washed with acetone or ethyl alcohol and dried in vacuo. In this manner a raw product is obtained, having 15–30 u./mg. It is preferable to add the proteins in the form of a 2–5% aqueous solution. This addition can be made before the acidification at pH 2.5–2.0, or after the acidification.

In the event that casein is used, it is necessary to prepare a 2% solution as follows: 100 g. of casein are dispersed in 5 liters of water; the suspension is brought to pH 2.0 with HCl and boiled for five minutes.

The suspension is cooled and filtered with filtering earth; the opalescent solution is brought again to pH 2.0 and added slowly, while stirring, to the liquid containing the heparin, which has already been acidified to pH 2.5–2.0.

All proteins which are water-soluble or solubilizable in an acid medium can obviously be used for this purpose.

In this process, all of the more expensive solvents which are used in many other methods for the separation of the raw products can be eliminated or reduced to a minimum, obtaining nevertheless optimum yields of activity. It is also possible to work on large amounts of tissues, the volumes in the extraction, digestion and other steps being reduced to a minimum.

As an alternative to the centrifugation for recovery of the final precipitate, which is difficult when large amounts of tissues are worked upon, it is possible to filter this precipitate by means of small amounts of filtering earth, in which case the precipitate consists mainly of the filtering earth itself. To free the heparin from the filtering earth, it is sufficient to suspend the product in a 1% solution of NaCl, to bring the pH to 8.0–9.0 with NaOH, then heat at 60–70° C. for 10 minutes and filter. The filtrate is then treated with alcohol, acetone or any other water-soluble organic solvent until a concentration of 50% is reached, thus obtaining a precipitate of raw heparin, which is recovered by centrifuging, washed with a little acetone or ethyl alcohol and dried in vacuo.

In the following examples the process followed is described in more detail.

*Example 1*

50 kg. of beef small intestine was ground and added to 20–25 liters of tap water. The autolysis was effected for about 20–24 hours at 37–40° C., while slowly stirring, and in the presence of toluene (500 ml.). After the end of the autolysis the temperature was raised to the boiling point and the liquid was boiled for 30 minutes in order to denature the proteins and to free the fats. The latter were eliminated by cooling the suspension to about 20° C. while in a quiescent state. The fat coagulated on the surface was removed mechanically. The fat-free suspension was digested for 24 hours with pancreatin at 37–40° C., with slow stirring. At first 50 g. of enzymes dissolved in a little water were added, and the same amount added after 8–10 hours. A further 500 ml. of toluene were also added.

The pH was kept at 8.0–8.5 by means of successive additions of 10 N NaOH. The additions were made at intervals of 15–20 minutes in the first hours, then at increasing intervals.

After the end of the digestion the temperature was raised to 90–95° C. and the liquid was maintained at the same temperature for 30 minutes. 2.5 kg. of filtering earth were added and the liquid was filtered still hot through a plate filter press. A large amount of inactive material was eliminated while the whole heparinic activity remained in the turbid filtrate.

The pH of this filtrate was lowered to 7.5, 1.2 kg. of filtering earth was added, the temperature was raised to 70–80° C. and was then left to cool to 18–20° C. By cold filtering a clear and highly colored filtrate was obtained.

The separated solid material was found to be inactive.

To the clear filtrate was added a 5% aqueous solution of seralbumin (50 g. in 1 liter of water). Filtering earth was added (150 g.) and the pH was brought to 2.5–2.0 with concentrated HCl. After standing overnight the clear supernatant was siphoned off and the precipitate collected by filtration. It was washed several times with a little acetone and dried in vacuo.

The heparin was extracted by suspending this precipitate in 1.5 liters of 1% NaCl and bringing the pH to 8.5 by means of NaOH. The liquid was heated to 60° C. and after, cooling, filtered on a buchner funnel. The residue was washed in the funnel with small volumes of 1% NaCl and the whole filtrate (2 liters) was treated with the same volume of acetone. After three hours the precipitate was collected by centrifuging, washed with a little acetone and dried in vacuo. Yield: 45.5 g. Activity 22 u./mg. 20.000 u./kg. of intestine were recovered.

*Example 2*

80 kg. of beef lung were ground, added to tap water (45 liters) and autolyzed for 24 hours at 37–40° C. in presence of toluene (800 ml.).

The temperature was raised to the boiling point and the liquid was kept for 30 minutes at this temperature and the fats were eliminated by cooling. The digestion was carried out at 37–40° C. adding at first 120 g. of trypsin and after 8–10 hours an additional 120 g. of enzymes, the digestion lasting 24 hours in all. The pH was kept at 8.0–8.5 by adding at intervals 10 N NaOH while stirring continuously.

After the end of the digestion, the temperature was raised to 90–95° C. and the liquid was kept 30 minutes at this temperature. Next 4 kg. of filtering earth were added and the liquid was filtered, still hot, through a plate filter press. The still turbid filtrate was brought to pH 7.5, added to 2 kg. of filtering earth, heated to 70–80° C., then allowed to cool to room temperature. The liquid was filtered through a plate filter press at 18–20° C., this time obtaining a clear and colored filtrate, from which the heparin was precipitated by adding 80 g. of seralbumin dissolved in 2 liters of water, and by lowering the pH to 2.5–2.0 with concentrated hydrochloric acid.

After a night of standing, the flocky precipitate settled completely, and was collected by centrifuging after siphoning off the supernatant liquid.

The precipitate was washed twice with 1 liter of ethyl alcohol, twice with 500 ml. of acetone and then dried in vacuo. Yield 76 g. Activity 23 u./mg. 21.800 u./kg. of ox's lung were recovered.

*Example 3*

500 kg. of beef small intestine were ground, added to 250 liters of water and autolyzed at 37–40° C. for 24 hours in presence of toluene (5 liters). The temperature was then raised to the boiling point and the fats were eliminated by cooling.

The digestion was carried out with pancreatin at 37–40° C. for 24 hours. Next two liters of toluene and 400 g. of pancreatin suspended in about 2 liters of water were added while stirring slowly; the pH was kept at 8.0–8.5 by periodically adding 10 N NaOH. 8 hours after the first adding, an additional 400 g. of pancreatin were added.

The stirring was continued during the whole period of digestion. Then the temperature was raised to the boiling point and the liquid was filtered, still hot, by means of filtering earth (25 kg.) through a plate filter press. The turbid filtering liquid was brought to pH 7.5 and cold-filtered by means of filtering earth (10 kg.), obtaining a clear and colored filtrate. To this liquid were added 500 g. of raw seralbumin in 5% aqueous solution and 1.5 kg. of filtering earth.

The pH was brought, while stirring, to 2.0 by adding slowly 50% (V/V) $H_2SO_4$. After a night of standing the clear supernatant was siphoned off, the precipitate was collected by filtration, and it was then washed twice with alcohol and twice with acetone (10 liters), to eliminate inactive colored substance. The raw heparin was separated from the filtering earth by solubilizing it at pH 8.0–9.0 in 10 liters of hot water (70° C.). After filtration the clear and very colored solution was treated with the same volume of acetone and the precipitate was collected by centrifuging, after elimination of the clear supernatant. The precipitate was then washed with acetone and dried in vacuo. Yield: 410 g. Activity: 25 u./mg. 20.500 u./kg. of small intestine were recovered.

I claim:

1. A method for the preparation of heparin comprising: autolyzing a suspension of animal tissue in an aqueous medium; digesting the resulting autolysate with a proteolytic enzyme while maintaining said medium at a pH between 7.8 and 8.5; adding a mineral acid to said medium to lower its pH to approximately 7.5; heating said medium to a temperature between 70–80° C.; cooling said medium to precipitate inactive material; separating said inactive material from said medium, said medium then existing as a clear, colored solution containing the whole heparinic activity; contacting said medium at a pH of from 2–2.5 with a protein soluble therein to produce a precipitate containing the whole heparinic activity; and separating said precipitate from said medium.

2. A method according to claim 1 in which prior to adjusting the said pH of said medium to 7.5 after autolysis, said medium is heated to 90–95° C. and filtered while hot to remove a substantial proportion of the inactive material.

3. A method according to claim 1 in which said precipitate containing the whole heparinic activity is suspended in 1% NaCl solution, the pH of the suspension is raised to 8.0–9.0, said suspension is heated to 60°–70° C., said suspension is filtered and heparin is precipitated from the resultant filtrate with a solvent selected from the group consisting of ethyl alcohol and acetone.

4. A method according to claim 1 in which said protein is casein.

5. A method according to claim 1 in which said protein is lactalbumin.

6. A method according to claim 1 in which said protein is seralbumin.

7. A method according to claim 1 in which said protein is ovalbumin.

8. A method according to claim 1 in which said protein is a histone.

References Cited in the file of this patent

UNITED STATES PATENTS

| | | |
|---|---|---|
| 2,797,184 | Coleman | June 25, 1957 |
| 2,884,358 | Bush | Apr. 28, 1959 |

OTHER REFERENCES

Jaques: The Biochemical Journal, vol. 37, 1943, pages 189–195 (167–74 polysac), POSL.